US010377476B2

(12) United States Patent
Mohyi

(10) Patent No.: US 10,377,476 B2
(45) Date of Patent: Aug. 13, 2019

(54) IMPELLER-BASED VEHICLE PROPULSION SYSTEM

(71) Applicant: Mohyi Labs, LLC, West Bloomfield, MI (US)

(72) Inventor: John Mohyi, West Bloomfield, MI (US)

(73) Assignee: MOHYI LABS, LLC, West Bloomfield, MI (US)

(*) Notice: Subject to any disclaimer, the term of this patent is extended or adjusted under 35 U.S.C. 154(b) by 109 days.

(21) Appl. No.: 15/477,774

(22) Filed: Apr. 3, 2017

(65) Prior Publication Data
US 2017/0291700 A1 Oct. 12, 2017

Related U.S. Application Data

(60) Provisional application No. 62/319,949, filed on Apr. 8, 2016.

(51) Int. Cl.
B64C 27/20 (2006.01)
B64C 39/06 (2006.01)
B64C 27/32 (2006.01)
B64C 11/00 (2006.01)
B63H 11/08 (2006.01)
B63H 1/04 (2006.01)
B64C 29/00 (2006.01)
B64C 39/00 (2006.01)

(52) U.S. Cl.
CPC .............. B64C 27/20 (2013.01); B63H 1/04 (2013.01); B63H 11/08 (2013.01); B64C 11/001 (2013.01); B64C 27/32 (2013.01); B64C 29/0025 (2013.01); B64C 39/001 (2013.01); B64C 39/064 (2013.01); B63H 2011/082 (2013.01); B64C 2201/027 (2013.01); B64C 2201/108 (2013.01)

(58) Field of Classification Search
CPC ..... B64C 11/001; B64C 27/20; B64C 39/064; B63H 11/08; B63D 2011/082; F04D 17/16; F04D 17/165; F04D 29/28; F04D 29/4206; F04D 29/4253; F04D 29/441
See application file for complete search history.

(56) References Cited

U.S. PATENT DOCUMENTS

| 2,927,746 | A | * | 3/1960 | Mellen | B64C 39/064 180/117 |
| 3,333,762 | A | * | 8/1967 | Vrana | F04D 21/00 415/207 |
| 3,677,503 | A | * | 7/1972 | Freeman, Jr. | B64C 11/001 244/23 C |
| 3,747,726 | A |   | 7/1973 | Walter |  |

(Continued)

OTHER PUBLICATIONS

International Search Report dated Jul. 6, 2017 for corresponding PCT/US/2017026264 filed Apr. 6, 2017, 2 pages.

Primary Examiner — Joseph W Sanderson
(74) Attorney, Agent, or Firm — Brooks Kushman P.C.

(57) ABSTRACT

A vehicle includes a propulsion system using one or more impellers as opposed to propellers. The impellers impart circumferential and radial velocity components to the working fluid, which may be air or water. The air is deflected by counter-vortex chambers in a shroud to convert the circumferential and radial velocity to an axial velocity aligned with the axis of rotation of the impeller.

19 Claims, 4 Drawing Sheets

(56) References Cited

U.S. PATENT DOCUMENTS

| | | | |
|---|---|---|---|
| 5,503,351 A * | 4/1996 | Vass | B64C 39/064 244/12.2 |
| 5,713,769 A | 2/1998 | Jones | |
| 5,803,199 A | 9/1998 | Walter | |
| 6,595,753 B1 * | 7/2003 | Illingworth | B64C 11/001 416/182 |
| 6,616,094 B2 * | 9/2003 | Illingworth | B64C 11/001 244/12.1 |
| 6,672,539 B1 * | 1/2004 | Schoeneck | B64C 27/20 244/12.2 |
| 7,249,732 B2 | 7/2007 | Sanders, Jr. et al. | |
| 7,857,256 B2 * | 12/2010 | Hatton | B64C 39/064 244/12.2 |
| 8,074,918 B1 | 2/2011 | Monson et al. | |
| 8,128,019 B2 | 3/2012 | Annati et al. | |
| 8,596,570 B1 | 12/2013 | Carambat | |
| 8,602,350 B2 * | 12/2013 | Inamori | B64C 39/064 244/12.2 |
| 8,646,721 B2 | 2/2014 | Chapman et al. | |
| 9,162,764 B2 | 10/2015 | Babinsky et al. | |
| 9,493,235 B2 | 11/2016 | Zhou et al. | |
| 2008/0213090 A1 * | 9/2008 | Hatton | B64C 39/064 415/208.1 |
| 2010/0270420 A1 * | 10/2010 | Hansen | B64C 27/20 244/12.2 |
| 2010/0288889 A1 * | 11/2010 | Pruzina | B64C 39/064 244/23 C |
| 2010/0294878 A1 * | 11/2010 | Inamori | B60V 1/06 244/12.2 |
| 2011/0155860 A1 * | 6/2011 | Chapman | B64C 27/20 244/23 A |
| 2012/0068021 A1 * | 3/2012 | Babinsky | B64C 39/064 244/23 R |
| 2016/0304193 A1 * | 10/2016 | Marcel | B64C 27/08 |

* cited by examiner

IMPELLER-BASED VEHICLE PROPULSION SYSTEM

CROSS-REFERENCE TO RELATED APPLICATIONS

This application claims the benefit of U.S. provisional application Ser. No. 62/319,949 filed Apr. 8, 2016, the disclosure of which is hereby incorporated in its entirety by reference herein.

TECHNICAL FIELD

This disclosure relates to the field of propulsion systems for vehicles such as vertical-take-off drones or watercraft. More particularly, the disclosure pertains to a propulsion system utilizing one or more impellers in conjunction with a ducted stator.

BACKGROUND

Small vertical-take-off air vehicles, sometimes called drones, are used for recreation and commercial purposes such as inexpensive aerial photography. Typically these air vehicles rely on a set of rotating blades for both propulsion and lift. These vehicles are usually powered by batteries. Decreasing the power consumption of the vehicle permits longer flight times with a given battery size or increased payload by using a smaller battery. Larger vehicles, such as manned air vehicles and near-surface vehicles such as hovercraft also benefit from efficient aerodynamic propulsion, lift, or both. Similarly, water vehicles such as submarines or boats may benefit from more efficient hydrodynamic propulsion.

An aerodynamic or hydrodynamic rotor typically has airfoil-shaped blades designed to propel air or water parallel to the axis of rotation. The surfaces of the blades are predominantly normal to the axis of rotation, although they may be inclined slightly to provide some angle of attack and may be twisted such that the incidence is higher near the axis of rotation. Impellers, on the other hand, have a series of vanes oriented in a plane that is nearly parallel to the axis of rotation. Impeller vanes do not need an airfoil cross section. Impeller vanes propel air in a circumferential direction around the axis of rotation. The circumferential movement causes centripetal forces which propel the air in a radial direction away from the axis of rotation while also generating a vortex pattern.

SUMMARY

A vehicle propulsion system includes a first impeller, a shroud, and a first power source, such as an electric motor. The first impeller is supported for rotation about an axis. The first impeller has a first top surface defining a first aperture, a first bottom surface, and a first plurality of impeller vanes connecting the first top surface to the first bottom surface. The impeller vanes may be curved. The shroud defines a first plurality of counter-vortex chambers which divert flow emanating from the first impeller, converting a first circumferential velocity component to a direction parallel to the axis. The first power source is fixed to the shroud and rotates the first impeller about the axis in a first direction. The first power source may be supported below the first impeller by a first plurality of support arms extending from the shroud. A second impeller may also be supported for rotation, in an opposite direction, about the axis. The second impeller may have a second top surface defining a second aperture, a second bottom surface defining a third aperture adjacent to the first aperture, and a second plurality of impeller vanes connecting the second top surface to the second bottom surface. The shroud may define a second plurality of counter-vortex chambers configured to divert flow emanating from the second impeller to convert a second circumferential velocity component to the direction parallel to the axis. The second power source may be supported above the second impeller by a second plurality of arms extending from the shroud.

A vehicle includes a first impeller, a first shroud, and a first power source. The first impeller is supported for rotation about a first axis. The first impeller has a first top surface defining a first aperture, a first bottom surface, and a first plurality of impeller vanes connecting the first top surface to the first bottom surface. The first shroud defines a first plurality of counter-vortex chambers which divert flow emanating from the first impeller to convert a first circumferential velocity component to a direction parallel to the first axis. The first power source is fixed to the first shroud and rotates the first impeller about the first axis in a first direction. A second impeller may be supported for rotation about a second axis. The second axis may be offset from and parallel to the first axis. The second impeller may have a second top surface defining a second aperture, a second bottom surface, and a second plurality of impeller vanes connecting the second top surface to the second bottom surface. A second shroud may be fixed to the first shroud and may define a second plurality of counter-vortex chambers which divert flow emanating from the second impeller to convert a second circumferential velocity component to a direction parallel to the second axis. A second power source may be fixed to the second shroud and may rotate the second impeller about the second axis in a second direction opposite to the first direction. Third and fourth similarly structured impellers may be supported for rotation about third and fourth axes offset from and parallel to the first and second axes. Third and fourth similarly structured shrouds may define third and fourth sets of counter-vortex chambers.

A method of operating a vehicle includes rotating an impeller and deflecting air with counter-vortex chambers. The impeller may draw air from above the vehicle and expel the air into a shroud with first radial and circumferential velocity components. The counter-vortex chambers convert the first radial and circumferential velocity components into an axial velocity component parallel to the axis of rotation of the impeller. The method may further include descending into a body of water. Once in the water, the method may include rotating the impeller to expel water into the shroud and deflecting the water with the counter-vortex chambers. Finally, the method may include rising from the surface of the body of water back into the air.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1-4 illustrate a first embodiment of an aerial vehicle 10 having four propulsion units 12, 14, 16, and 18. As will be described below, each of the four propulsion units has a rotating impeller. The impellers of units 12 and 16 rotate clockwise as viewed from the top, while the impellers of units 14 and 18 rotate counter-clockwise as viewed from the top.

Figure 1:
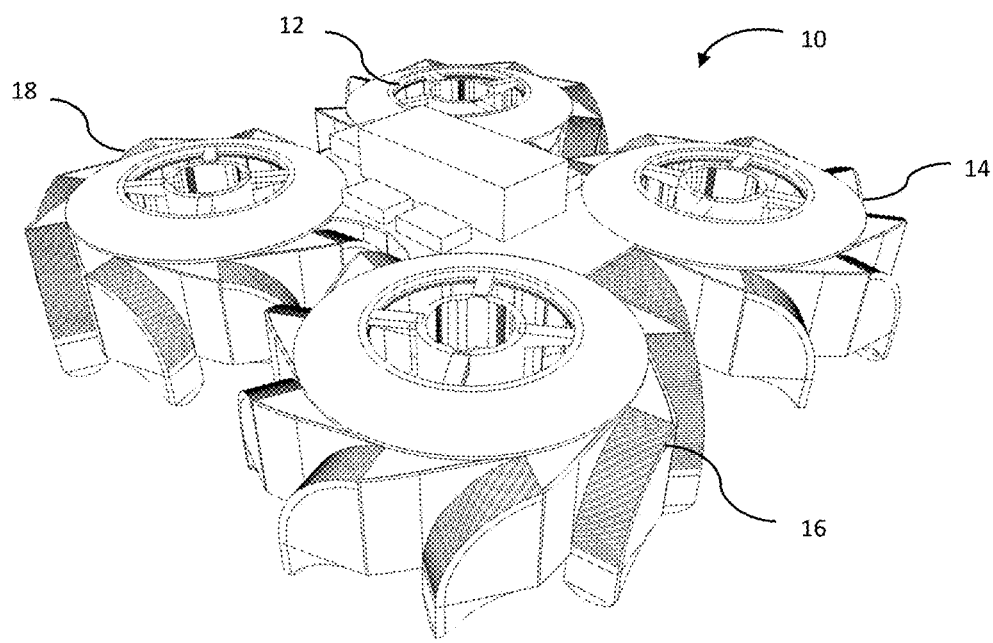
FIG. 1 is a pictorial view of a first air or water vehicle having four propulsion units.
Figure 2:
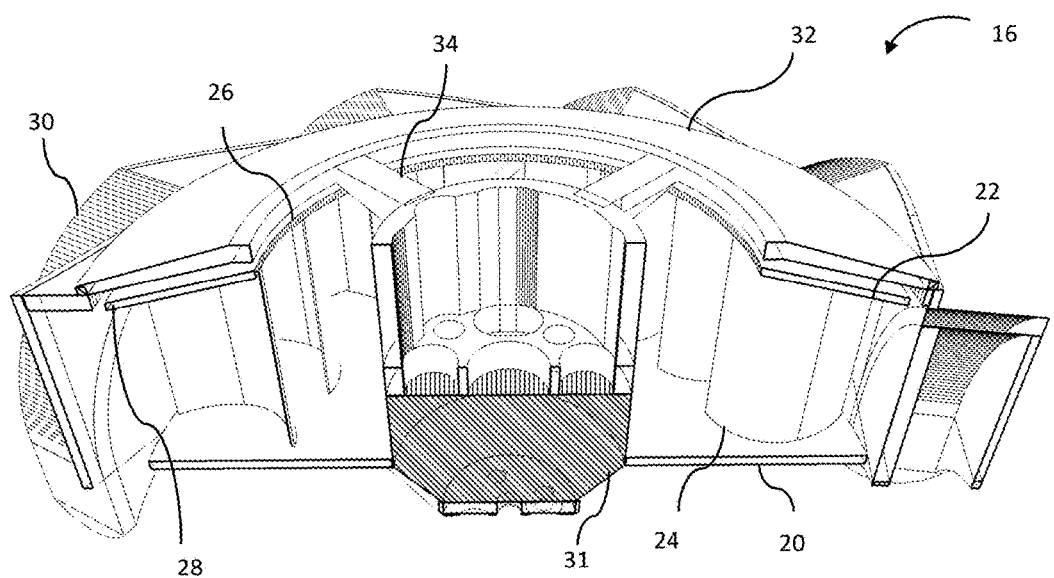
FIG. 2 is a cut-away view of one of the propulsion units of the vehicle of FIG. 1.

FIG. 2 is a cut-away view of one of the propulsion units. Each propulsion unit includes a shroud that is fixed to the vehicle and an impeller that rotates with respect to the vehicle. The impeller includes a bottom surface 20, a top surface 22, and a plurality of impeller vanes 24 connecting the top surface to the bottom surface. The top surface defines an aperture 26 and an outer edge 28. When the impeller rotates, the impeller vanes cause air between the top and bottom plates to rotate as well, imparting a circumferential velocity component to the air. Centrifugal forces propel that air radially, imparting a radial velocity component to the air. The air exits at an outer edge of the impeller and is replaced by air entering from above via the aperture 26 in the top surface. In the embodiment of FIG. 2, the impeller vanes are curved such that air flowing outward tends to turn counter-clockwise relative to the impeller (which is itself turning counter-clockwise). This tends to increase the circumferential velocity component of the exiting air. Alternative embodiments may include straight impeller vanes or impeller vanes that are curved in the opposite direction of impeller rotation. For water vehicles, the impeller vane curvature may be optimized to reduce or prevent cavitation.

Without a shroud or with only a shroud, the air exiting the impeller would create a vortex pattern. The shroud includes a series of counter-vortex chambers 30 which deflect the air exiting the impeller. The air is deflected such that the circumferential component and the radial component of the air velocity are converted to an axial component directed downwardly parallel to the axis of rotation of the impeller. As the vanes apply force to the air to change the direction of flow, the air applies an equal and opposite reaction force to the shroud. This reaction force includes an axial component pushing the shroud, and the vehicle, upwards.

The shroud supports a power source 31, such as an electric motor. The power source causes the impeller to rotate. When the power source is an electric motor, the stator of the motor is fixed to the shroud while the rotor of the motor is fixed to the impeller. Cooling air may be drawn through the motor from above and expelled into the impeller airstream below by the venturi effect. Heat added to the cooling air by the motor may increase the thrust. Ducting above the motor to atmospheric pressure may further increase thrust by maximizing the pressure difference above and below the motor thereby maximizing the flow rate of the cooling air through the motor. In the embodiment of FIG. 2, the shroud includes a top surface 32 adjacent to the top surface 22 of the impeller and a series of radial arms 34 extending from the top surface 32 to support the power source.

Propulsion units 14 and 18 are similarly structured, but are mirror images of propulsion units 12 and 16 to operate with impellers that rotate in the opposite direction. Use of multiple counter-rotating propulsion units prevents any net reaction torque on the vehicles from the multiple power sources.

Figure 3:
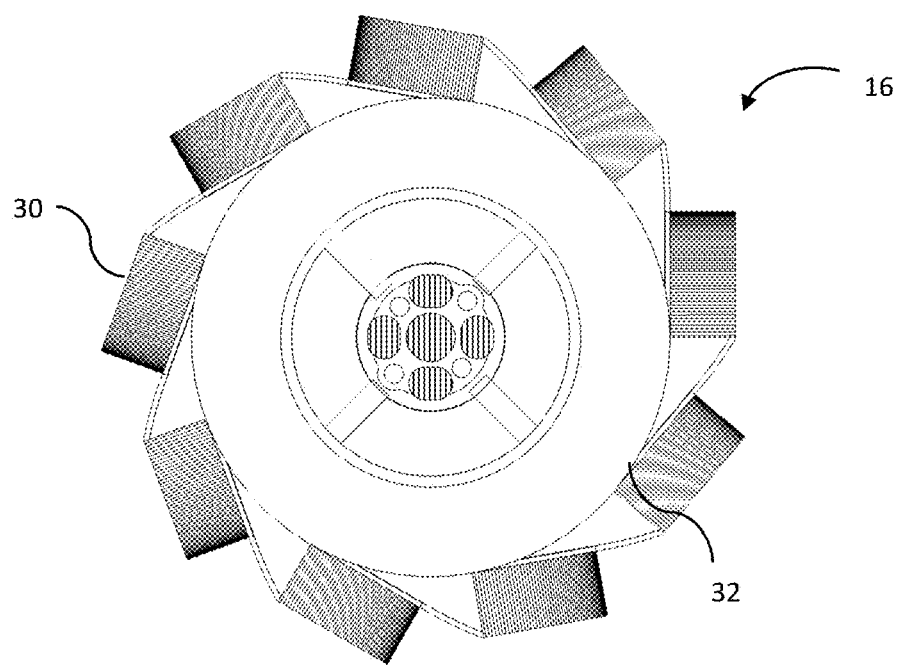
FIG. 3 is a top view of the propulsion unit of FIG. 2.
Figure 4:
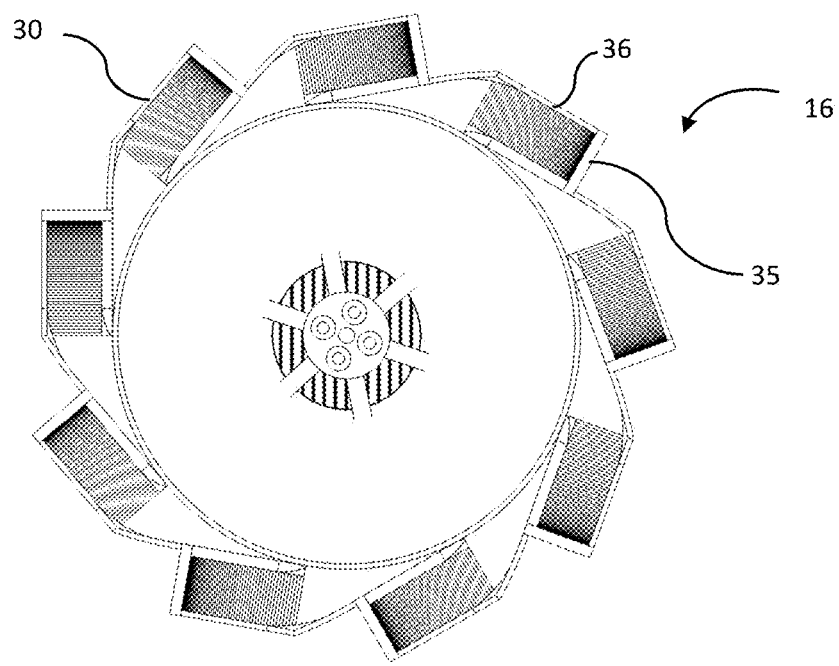
FIG. 4 is a bottom view of the propulsion unit of FIG. 2.

FIGS. 3 and 4 show top and bottom views, respectively, of the propulsion unit of FIG. 2. Referring to FIG. 4, notice that each of the counter-vortex chambers 30 in this embodiment is defined by a quarter-elliptical wall 35 and a substantially flat outer wall 36.

Figure 5:
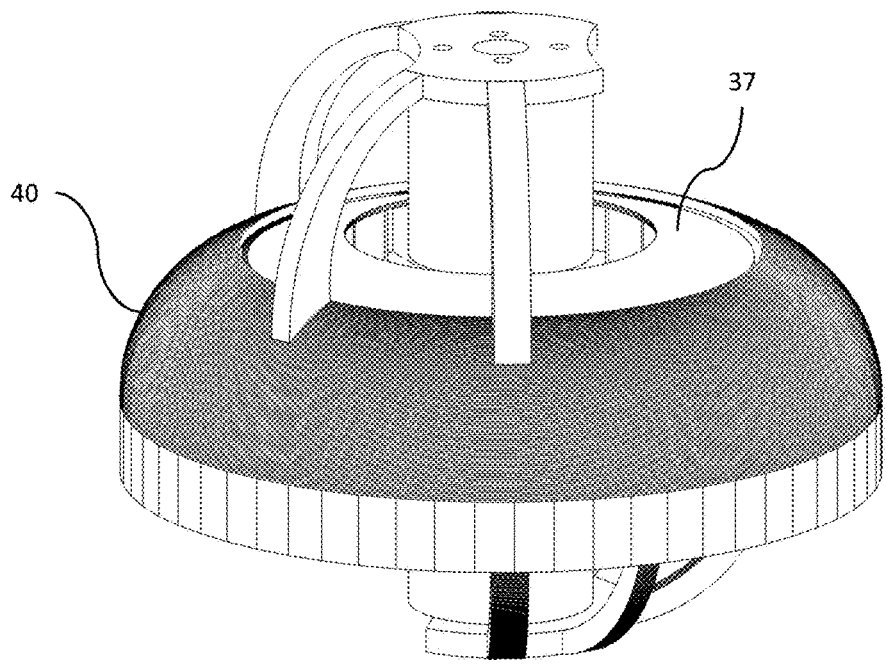
FIG. 5 is a pictorial view of a second air or water vehicle having two co-axial, counter-rotating impellers.
Figure 6:
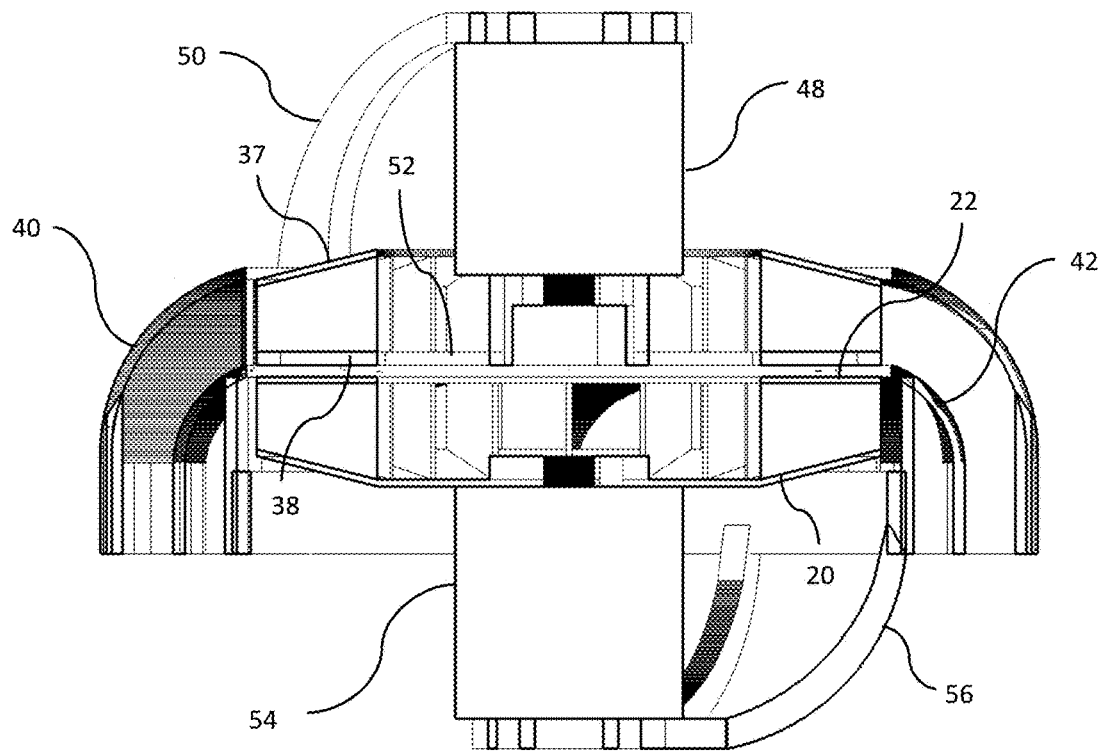
FIG. 6 is a cut-away side view of the vehicle of FIG. 5.

FIG. 5 is a pictorial view of a dual-impeller propulsion unit. A cut-away view is shown in FIG. 6. A second impeller is located on top of the first impeller. The second impeller has a top surface 37 with an aperture and a bottom surface 38 with an aperture. One of the impellers rotates clockwise, as viewed from the top, while the other impeller rotates counter-clockwise. The top impeller draws air from above, through the aperture in its top surface, and propels the air outward with radial and circumferential velocity components. The bottom impeller draws air in through the aperture in the top surface of the top impeller, the aperture in the bottom surface of the top impeller, and the aperture in the top surface of the bottom impeller. The air is propelled outward with radial and circumferential velocity components, although the circumferential velocity components are in the opposite direction as the top impeller.

Figure 7:
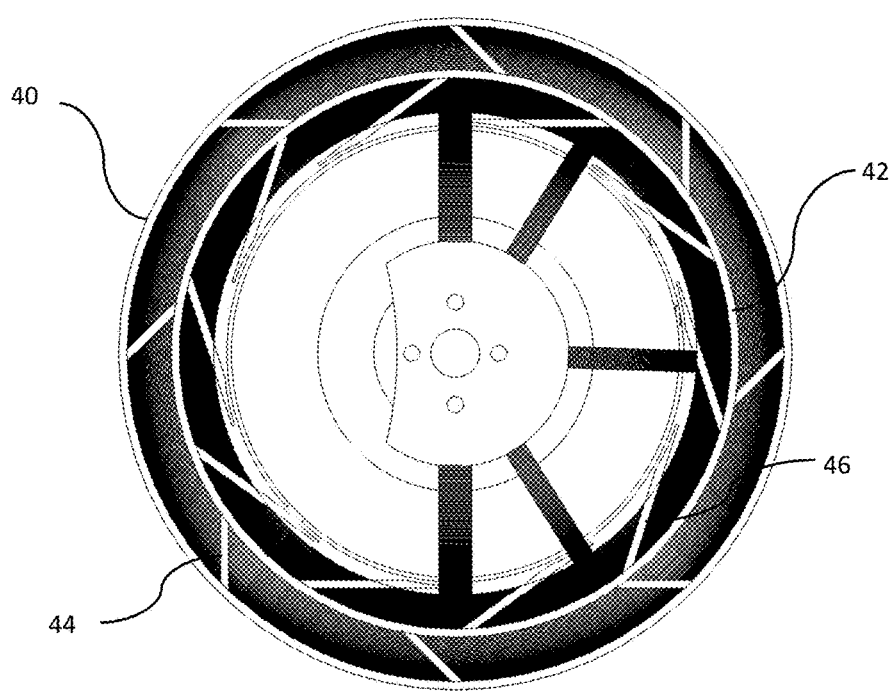
FIG. 7 is a bottom view of the vehicle of FIG. 5.

The non-rotating shroud includes outer ducting 40 and inner ducting 42. Both the inner ducting and the outer ducting are curved to re-direct the radial component of the air velocity to a downward axial direction. Air exiting the top impeller flows between the outer ducting 40 and the inner ducting 42. Air exiting the bottom impeller is directed downward by the inner ducting. As shown in the bottom view of FIG. 7, a first set of counter-vortex chambers 44 in defined between the inner and outer ducting. These chambers re-direct the circumferential velocity component of the air exiting the top impeller to a downward axial direction. A second set of counter-vortex chambers 46 is defined within the inner ducting 42. This second set of counter-vortex chambers re-directs the circumferential velocity component of the air exiting the bottom impeller to a downward axial direction.

A first power source 48 is supported from the shroud by a first set of support arms 50. The first power source provides power to rotate the top impeller via a number of radial arms 52 connecting the power source to the bottom surface 38 of the top impeller while not blocking the flow of air through the aperture in the bottom surface 38. A second power source 54 is supported from a second set of support arms 56 to power the bottom impeller.

The vehicles of FIGS. 1 and 5-7 are suited for use both in the atmosphere and underwater, and for transitioning between these environments. For example, the vehicle may depart from a land base, fly through the air to a body of water, descend into the body of water, propel itself on the surface of the water or completely submerged, transition from the surface of the water back into the air, and return to a land base. Alternatively, the vehicle may depart from or arrive at a marine base.

Although propellers are used in both aircraft and watercraft, the physical dimensions are optimized for the medium such that a specific propeller is not suitable for use in both media. Due to the lower density of air, air vehicles require larger propeller diameters to increase the volume of air impacted. However, large diameter propellers are unsuitable for use in water. The higher density of the water medium amplifies the stress forces along length of the blade and may cause it to bend or break. The longer the blade, the more torque required which may overstress the motor. Further, each point on a blade, from the origin to the tip, moves at a different speed. The longer the blade, the sooner the tip will reach an oscillation speed or Mach 1. In the impeller based propulsion system, on the other hand, the forces can be spread among many relatively shorter impeller vanes. Each impeller vane is supported along its full length by the top and bottom plates.

Due to the high density of water relative to air, the impeller speed would be much lower to generate the same level of thrust. Even if the impeller vane curvature is optimized to avoid cavitation in water, it would still be suitable for aerial use at an appropriately higher speed. Thrust is enhanced in both water and air operation by the counter-vortex chambers ability to direct the outgoing flow in the desired direction with negligible radial or circumferential velocity components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a first impeller supported for rotation about a first axis;
a first power source configured to rotate the first impeller about the first axis in a first direction such that the first impeller draws fluid from above the vehicle and expels the fluid with radial and circumferential velocity components; and
a first shroud surrounding a perimeter of the first impeller and fixed to the vehicle, the first shroud defining a first plurality of circumferentially spaced apart counter-vortex chambers to divert the fluid toward an axial direction, each counter-vortex chamber defined by a quarter-elliptical wall fixed to an outer wall.

2. The vehicle of claim 1 further comprising:
a second impeller supported for rotation about a second axis;
a second power source configured to rotate the second impeller about the second axis in a second direction opposite to the first direction; and
a second shroud surrounding a perimeter of the second impeller and fixed to the vehicle, the second shroud defining a second plurality of counter-vortex chambers to divert fluid expelled by the second impeller toward the axial direction.

3. The vehicle of claim 2 wherein the second axis is parallel to and offset from the first axis.

4. The vehicle of claim 3 further comprising:
a third impeller supported for rotation about a third axis offset from and parallel to the first and second axes;
a third power source configured to rotate the third impeller about the third axis in the first direction;
a third shroud surrounding a perimeter of the third impeller and fixed to the vehicle, the third shroud defining a third plurality of counter-vortex chambers to divert fluid expelled by the third impeller toward the axial direction;
a fourth impeller supported for rotation about a fourth axis offset from and parallel to the first through third axes;
a fourth power source configured to rotate the fourth impeller about the fourth axis in the second direction; and
a fourth shroud surrounding a perimeter of the fourth impeller and fixed to the vehicle, the fourth shroud defining a fourth plurality of counter-vortex chambers to divert fluid expelled by the fourth impeller toward the axial direction.

5. The vehicle of claim 4 wherein the first through fourth power sources are electric motors.

6. A vehicle propulsion system comprising:
a first impeller supported for rotation about an axis, the first impeller having a first top surface defining a first aperture, a first bottom surface, and a first plurality of impeller vanes connecting the first top surface to the first bottom surface;
a first power source configured to rotate the first impeller about the axis in a first direction such that the first impeller draws fluid into the first aperture and expels the fluid with radial and circumferential velocity components; and
a shroud surrounding a perimeter of the first impeller, the shroud configured to divert the circumferential component toward a direction parallel to the axis, the shroud defining a first plurality of circumferentially spaced apart counter-vortex chambers to divert the fluid downwardly in an axial direction.

7. The vehicle propulsion system of claim 6 wherein each of the counter-vortex chambers are defined by a quarter-elliptical wall fixed to an outer wall.

8. The vehicle propulsion system of claim 6 wherein the first power source is supported below the first impeller by a first plurality of support arms extending from the shroud.

9. The vehicle propulsion system of claim 6 wherein the first power source is an electric motor having a stator fixed to the shroud and a rotor fixed to the first impeller.

10. The vehicle propulsion system of claim 6 wherein the shroud comprises:
a first curved wall having a first upper edge adjacent to an outer edge of the first top surface, the first wall parallel to the axis at a first lower edge; and
a first plurality of dividers attached to an inner surface of the first wall.

11. The vehicle propulsion system of claim 10 further comprising:
a second impeller supported for rotation about the axis, the second impeller having a second top surface defining a second aperture, a second bottom surface defining a third aperture adjacent to the first aperture, and a second plurality of impeller vanes connecting the second top surface to the second bottom surface; and
wherein the shroud is configured to divert fluid expelled by the first impeller toward the direction parallel to the axis.

12. The vehicle propulsion system of claim 11 further comprising a second power source fixed to the shroud and configured to rotate the second impeller about the axis in a second direction opposite the first direction.

13. The vehicle propulsion system of claim 12 wherein the second power source is supported above the second impeller by a second plurality of arms extending from the shroud.

14. The vehicle propulsion system of claim 11 wherein the shroud further comprises:
a second curved wall having a second upper edge adjacent to an outer edge of the second top surface, the second wall parallel to the axis at a second lower edge; and
a second plurality of dividers attached to an inner surface of the second wall and an outer surface of the first wall.

15. The vehicle propulsion system of claim 6 wherein the impeller vanes are curved.

16. A method of operating a vehicle comprising:
rotating an impeller relative to a fixed shroud such that the impeller draws air from above the vehicle and expels the air into the shroud with first radial and circumferential velocity components; and
deflecting the air with a plurality of circumferentially spaced apart counter-vortex chambers defined by the shroud to convert the first radial and circumferential velocity components into an axial air velocity parallel to an axis of rotation of the impeller.

17. The method of claim 16 further comprising descending into a body of water.

18. The method of claim 17 further comprising:
rotating the impeller relative to the fixed shroud such that the impeller expels water into the shroud with second radial and circumferential velocity components; and
deflecting the water with the counter-vortex chambers to convert the second radial and circumferential velocity components into an axial water velocity parallel to the axis of rotation of the impeller.

19. The method of claim 18 further comprising rising from a surface of the body of water.

\* \* \* \* \*